US006632513B1

(12) United States Patent
Choi et al.

(10) Patent No.: US 6,632,513 B1
(45) Date of Patent: Oct. 14, 2003

(54) ANTIREFLECTION FILM

(75) Inventors: Hyung Chul Choi, Lexington, MA (US); Edward P. Lindholm, Brookline, MA (US); William K. Smyth, Sudbury, MA (US); Pradnya V. Nagarkar, Newton, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/571,742

(22) Filed: May 15, 2000

Related U.S. Application Data

(63) Continuation-in-part of application No. 09/026,271, filed on Feb. 19, 1998.

(51) Int. Cl.$^7$ ................................................. B32B 7/02
(52) U.S. Cl. ........................ 428/216; 428/336; 428/339; 428/461; 428/689; 427/383.1; 427/384; 427/404; 427/407.1; 427/419.2; 427/419.5
(58) Field of Search ................................ 428/421, 422, 428/457, 461, 689, 332, 333, 334, 335, 336, 339, 215, 216; 427/372.2, 383.1, 384, 402, 404, 407.1, 419.1, 419.2, 419.5

(56) References Cited

U.S. PATENT DOCUMENTS

| | | | |
|---|---|---|---|
| 3,793,022 A | 2/1974 | Land et al. | ........................ 96/3 |
| 3,925,081 A | 12/1975 | Chiklis | ........................ 430/14 |
| 4,047,804 A | 9/1977 | Stephens | .................... 359/586 |

(List continued on next page.)

FOREIGN PATENT DOCUMENTS

| | | |
|---|---|---|
| EP | 0300661 | 1/1989 |
| EP | 0749021 | 12/1996 |
| EP | 0924537 A1 | 6/1999 |
| JP | 63228101 A | 9/1988 |
| JP | 04338901 A | 11/1992 |
| WO | WO96/31343 | 10/1996 |
| WO | WO98/07056 | 2/1998 |
| WO | WO99/42860 | 8/1999 |

OTHER PUBLICATIONS

SID 96 Applications Digest, Society for Information Display International Symposium Digest of Applications Papers, "Linear Polarizer Advancements with the Use of Hydrophobic Multilayer Thin–Film Coating Technology," M.D. Parish et al., 1996 pp. 25–28.
Derwent Abstract of Japanese Application Publication (Kokai) No. 63–248807.
Southwall Technologies, "Thin Film Coatings . . . ", SID International Symposium and Exhibition, San Diego, CA, May 1996.
PCT Search Report WO 0031570, PCT/US99/26229, dated Feb. 28, 2000.
Patent Application Ser. No. 09/026,271 for Antireflection Film filed Feb. 19, 1998—applicant Choi et al.

*Primary Examiner*—Paul Thibodeau
*Assistant Examiner*—Christopher Paulraj
(74) *Attorney, Agent, or Firm*—Stephen W. Buckingham

(57) ABSTRACT

An article includes an antireflection composite material, a substrate, and an inorganic layer deposited onto the substrate. The inorganic layer has a thickness of from about 1 nm to about 10 nm. The article includes a polymer layer in contact with the inorganic layer to form an outer surface of the antireflection composite material. The polymer layer has a thickness of from about 70 nm to about 120 nm.

32 Claims, 2 Drawing Sheets

U.S. PATENT DOCUMENTS

| | | | |
|---|---|---|---|
| 4,066,814 A | | 1/1978 | Chiklis .................... 428/333 |
| 4,070,097 A | * | 1/1978 | Gelber .................... 350/165 |
| 4,234,654 A | | 11/1980 | Yatabe et al. ............. 428/333 |
| 4,320,169 A | | 3/1982 | Yatabe et al. ............. 428/333 |
| 4,361,598 A | * | 11/1982 | Yoldas ..................... 427/74 |
| 4,386,130 A | | 5/1983 | Hayashi et al. ............ 428/215 |
| 4,422,721 A | | 12/1983 | Hahn et al. ................ 350/164 |
| 4,465,736 A | | 8/1984 | Nishihara et al. ........... 428/332 |
| 4,747,674 A | | 5/1988 | Butterfield et al. ......... 350/399 |
| 4,765,729 A | | 8/1988 | Taniguchi .................. 351/163 |
| 4,904,525 A | | 2/1990 | Taniguchi et al. ........... 428/328 |
| 4,940,602 A | | 7/1990 | Taniguchi et al. ........... 427/40 |
| 5,061,769 A | | 10/1991 | Aharoni .................... 526/245 |
| 5,106,671 A | | 4/1992 | Amberger et al. ........... 428/215 |
| 5,118,579 A | | 6/1992 | Aharoni et al. ............. 428/422 |
| 5,139,879 A | | 8/1992 | Aharoni et al. ............. 428/422 |
| 5,171,414 A | | 12/1992 | Amberger et al. ........... 204/192.26 |
| 5,178,955 A | | 1/1993 | Aharoni et al. ............. 428/421 |
| 5,198,267 A | | 3/1993 | Aharoni et al. ............. 427/162 |
| 5,225,244 A | | 7/1993 | Aharoni et al. ............. 427/240 |
| 5,234,748 A | | 8/1993 | Demirymont et al. ...... 428/216 |
| 5,392,156 A | | 2/1995 | Kumagai et al. ........... 359/586 |
| 5,409,777 A | | 4/1995 | Kennedy et al. ........... 428/411.1 |
| 5,449,558 A | | 9/1995 | Hasegawa et al. .......... 428/422 |
| 5,514,526 A | | 5/1996 | Nishi et al. ................. 430/325 |
| 5,693,366 A | | 12/1997 | Mase et al. ................. 426/164 |
| 5,763,061 A | | 6/1998 | Ochiai et al. ............... 428/215 |
| 5,783,049 A | | 7/1998 | Bright et al. ............... 204/192.14 |
| 5,820,957 A | | 10/1998 | Schroeder et al. .......... 428/40.1 |
| 6,379,788 B2 | | 4/2002 | Choi et al. .................. 428/333 |

* cited by examiner

ANTIREFLECTION FILM

CROSS REFERENCE TO RELATED APPLICATIONS

This application is a continuation-in-part of pending application Ser. No. 09/026,271, filed Feb. 19, 1998, entitled "ANTIREFLECTION FILM", the disclosure of which is incorporated by reference herein.

TECHNICAL FIELD

This invention relates to antireflection composite materials, and in particular, to an anti-reflective film.

BACKGROUND

There are many cases in which the visibility of information or an image through an optically transparent medium would be enhanced if the tendency of the surface to cause glare were reduced. Glare, or specular glare, is the undesirable reflection of light from a surface upon which light is incident. The reduction of reflection is desirable in numerous settings, including, for example, in vehicular windows, protective eyewear, computer monitor screens, television screens, and other display panels.

It is therefore desirable to provide an antireflection composite material for application to such surfaces that would reduce the amount of glare. Currently available antireflection composite materials on a surface typically include inorganic layers, for example, a metal or metal oxide layer, and a silica layer that includes $SiO_x$, where x is an integer value typically equal to about 2. Additionally, a layer of indium tin oxide (ITO) may also be provided. Once the antireflection composite material is applied to the surface, an antireflection article is formed. However, both ITO and $SiO_x$ are difficult to sputter, and therefore, production costs for an antireflection article using ITO and/or $SiO_x$ are generally high.

SUMMARY

In one aspect, a an article includes an antireflection composite material, a substrate, an inorganic layer deposited onto the substrate, and a polymer layer in contact with the inorganic layer to form an outer surface of the antireflection composite material. The inorganic layer has a thickness of from about 1 nm to about 10 nm. The polymer layer has a thickness of from about 70 nm to about 120 nm.

Embodiments may include one or more of the following features. For example, the inorganic layer may be formed from a metal. The metal may include nickel. The nickel may have a thickness of from about 2 nm to about 3.5 nm. The metal may include chromium. The inorganic layer may include titanium nitride.

The polymer layer may have a thickness of from about 100 nm to about 110 nm. The polymer layer may have a refractive index less than or equal to about 1.53 over the wavelength range of about 400 nm to about 700 nm.

The article may include a hard coat disposed between the substrate and the inorganic layer.

The inorganic layer may absorb a percentage of the incident light depending on an overall required transmission of the antireflection composite material. A thickness of the inorganic layer may depend on dispersion qualities of the inorganic layer.

A total thickness of the antireflection composite material may be about one-fourth of a wavelength that is a mean of the wavelengths in the visible spectrum. The total thickness of the antireflection composite material may equal a sum of the thickness of the inorganic layer and the thickness of the polymer layer.

The article may exhibit a photopic reflectance of less than about 0.5 percent over the wavelength range of about 400 nm to about 700 nm. The polymer layer may be formed by curing a curable composition in situ on the inorganic layer.

Aspects of the techniques and systems can include one or more of the following advantages. The single-inorganic layer structure provides antireflection performance substantially equal to that of previous antireflection composite materials that also include layers of other inorganic layers, while still providing a substantial reduction in production costs, since the thick silica layers and/or the other inorganic layers are eliminated.

The optically active outer polymer layer of carefully controlled refractive index above an inorganic layer reduces the overall cost of making and producing the antireflection composite material because the thickness of the inorganic layer can be greatly reduced. Moreover, an antireflection composite material that uses such an optically active outer polymer layer has good scratch and stain resistance, such as, for example, antifingerprinting resistance.

The antireflection composite material may be implemented on a CRT screens, including the newer flat panel screens that are produced by varying the thickness of the glass surface that serves as the optically transparent surface. Because of this varying thickness, tinted glass, which traditionally has served to reduce glare on CRT screens, cannot be used for the flat panel screens. The antireflection composite material may be implemented in organic light emitting diodes (LEDs) that have been used in hand-held devices.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
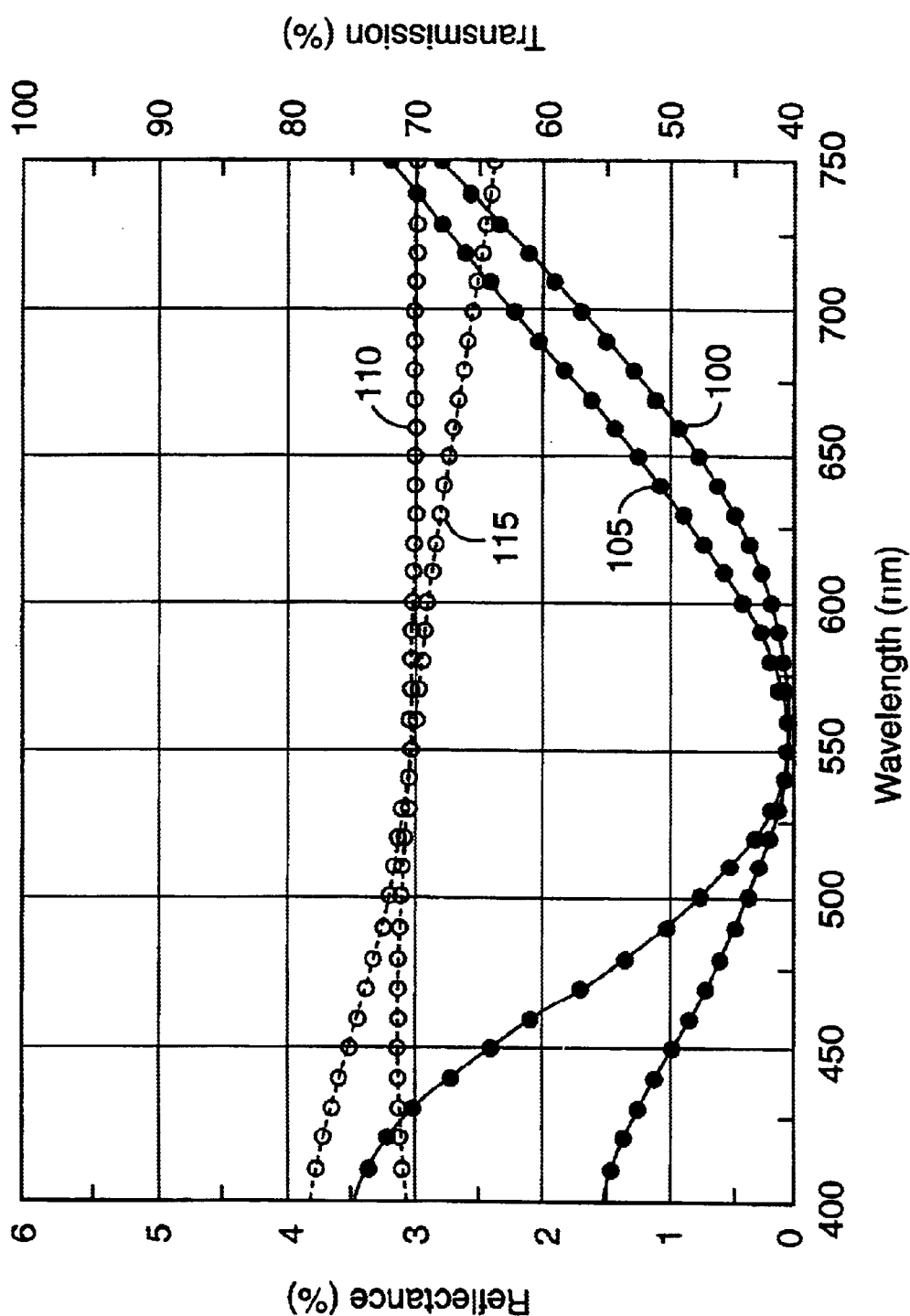
FIG. 1 shows a simulation of reflectance and transmission curves for an antireflection composite material in which composite layers of an indium tin oxide layer, an inorganic layer of chromium or nickel, and an outer polymer layer have been adjusted.

Referring to FIG. 1, theoretical simulations of reflectance and transmission are graphed for a polymeric antireflection article that includes a surface or substrate made of hard coated (HC) polyethylene terephthalate (PET) and an antireflection composite material. In these simulations, a thickness of each composite layer of the antireflection composite material was adjusted to determine an antireflection composite material that produces an 80 percent reflectance. It was found that the antireflection composite material need not include a layer of ITO, as has been used in previous antireflection composite materials. In particular, the two antireflection composite materials were simulated. A first antireflection composite material included an inorganic layer of nickel and an outer polymer layer. The first antireflection composite material exhibited a reflectance curve 100 and a transmission curve 110. A second antireflection composite material exhibited a reflectance curve 105 and a transmission curve 115.

As can be seen from these reflectance curves 100 and 105, the minimum reflectance is centered around the wavelength 550 nm, which is the wavelength at which the human eye is most sensitive.

An antireflection composite material for a substrate is therefore provided that includes an inorganic layer with a relatively high refractive index and an outer polymer layer with a relatively low refractive index. The outer polymer layer is formed on the inorganic layer by depositing a layer of a curable composition and then curing this layer in situ. The relatively thick layer of curable composition required can be applied with good uniformity by solution coating or other conventional coating techniques. Also, the provision of the thick outer polymer layer enables the thickness, and thus the cost, of the inorganic layer to be reduced. For example, one embodiment of the antireflection composite material described below includes a 2.8 nm thick nickel (Ni) layer and a 110 nm thick outer polymer layer.

A substrate of the antireflection composite material may be any material on which an antireflection coating is desired, provided that the substrate can withstand the relatively mild conditions needed for deposition of the inorganic layer and the curing of the curable composition. The substrate may be a finished optical article, for example, a lens, a display surface of a cathode ray tube (CRT), or an LED display. The substrate may be a plastic film, typically a polyester film, a cellulose triacetate, or a glass. Suitable polyester films are readily available commercially, for example, any of the 101–177 µm polyethylene terephthalate (PET) films sold under the trademark "MELINEX" by ICI Americas Inc., Wilmington, Del. Generally, any PET with a thickness from about 40 µm to about 400 µm may be used.

If the substrate is a plastic film, it may be provided with coatings on one or both surfaces to improve its hardness and scratch resistance, to improve the adhesion of the inorganic layer to the substrate, or to provide any other desired properties, for example, filtration of ultra-violet radiation or blocking against gas and/or moisture. A hard coating on the substrate typically has a thickness of about 1 to about 15 µm, preferably from about 2 to about 3 µm. Such hard coating may be provided by free radical polymerization initiated either thermally or by ultra-violet radiation of an appropriate polymerizable material. One hard coat for use in the substrate is sold under the trademark "TERRAPIN" by Tekra Corporation, 6700 West Lincoln Avenue, New Berlin, Wis. 53151.

As indicated above, the antireflection composite material includes an inorganic layer. This layer may be formed from any of the inorganic materials used in previous antireflection composite materials. Inorganic materials include nickel (Ni), chromium (Cr), titanium nitride, silica nitride, metal oxides, or any absorptive metal that has a high refractive index. Examples of metal oxides include titanium oxide, nickel oxide, chromium oxide, indium oxide, cadmium oxide, gallium indium oxide, niobium pentoxide, indium tin oxide, and tin dioxide. Ni has good reflection properties and suitable dispersion characteristics; accordingly, the inorganic layer is preferably a composition of nickel for the polymer layer described below.

The thickness of the inorganic layer and the polymer layer of the antireflection composite material should be correlated so that the total thickness of these layers is approximately $\lambda/4$ of the center of the wavelength range for which antireflection characteristics are desired. For example, the total thickness may be approximately 120–145 nm when antireflection characteristics are desired over a range of from about 300 nm to about 850 nm, which encompasses the visible spectrum. Also, the thickness of the inorganic layer and the outer polymer layer may be adjusted relative to one another to produce minimum reflectivity from the composite film.

The inorganic layer has a thickness of about 1 nm to about 10 nm and preferably about 2 nm to about 3.5 nm, while the outer polymer layer has a thickness of about 70 to about 120 nm, and preferably about 100 nm to about 110 nm. The upper bound for the thickness of the antireflection layer of Ni is dependent on the absorption quality of the Ni. For greater values of thickness, Ni begins to absorb too much incident light and the percentage transmission reduces. Accordingly, the level of transmission may be adjusted by modifying the thickness of the Ni layer. Typically, Ni with a thickness of about 2.8 nm absorbs between about 20 percent and about 30 percent of incident light at wavelengths in the visible range.

Although other techniques, for example, e-beam and thermal evaporation, may be used to deposit the inorganic layer onto the substrate, the inorganic layer is preferably deposited by sputtering or chemical vapor deposition. Examples of some useful sputtering techniques include DC sputtering, radio-frequency sputtering, magnetron sputtering, direct sputtering, and reactive sputtering. Examples of some useful chemical vapor deposition techniques include low-pressure, plasma-enhanced, and laser enhanced chemical vapor deposition. The deposition of the inorganic layer should be effected at a temperature that does not cause damage to the substrate. This temperature limit varies with the exact substrate employed. For example, the temperature limit for plastic substrates is relatively lower than the temperature limit for glass substrates.

As indicated above, the outer polymer layer of the antireflection composite material has a refractive index not greater than about 1.53 over the wavelength range of about 400 nm to about 700 nm for a thickness of from about 70 nm to about 120 nm. Polymer layers having thickness within these ranges are readily prepared by depositing a solution of an appropriate curable material in an organic solvent using conventional solution coating techniques, such as, for example, slot coating, removing the solvent, and curing the resultant layer of curable material.

It is desirable to keep the refractive index of the outer polymer layer as low as possible consistent with other acceptable properties for this layer, especially hardness and scratch and stain resistance. The outer polymer layer should also be resistant to cleaning solvents that may be used on the antireflection composite material, for example, ethyl alcohol, aqueous ammonia, acetone, gasoline and isopropanol, and food and cosmetic items. Moreover, the polymer should also have good durability, as measured, for example, by its ability to withstand rubbing with steel wool.

To provide the suitable relatively low refractive index, the curable composition used to form the outer polymer layer desirably includes a polymer of a fluoroalkene, for example, poly(vinylidene fluoride) or a vinylidene fluoride/tetrafluoroethylene copolymer, such as the material sold under the trademark "KYNAR" by San Diego Plastics, Inc., 2220 McKinley Ave., National City, Calif. 91950. However, since an outer polymer layer consisting only of a fluoroalkene polymer will typically be too soft to give good scratch protection, it is also desirable that the curable composition include an alkyl acrylate or methacrylate polymer, such as the material sold under the trademark "ELVACITE 2041" by ICI Acrylics, Inc., 3411 Silverside Road-McKean 2$^{nd}$, Wilmington, Del. 19850-5391, or that sold under the trademark "ACRYLOID A21" by Rohm and Haas, 100 Independence Mall West, Philadelphia, Pa. 19106-2399.

To promote cross-linking within the outer polymer layer, and thus increase the hardness of this layer, it is advantageous to include a polyfunctional acrylate monomer (polyfunction denoting a material having a functionality of 3 or higher) in the curable composition. One polyfunctional acrylate monomer is that sold under the trademark "SR 399" by Sartomer, Inc., 502 Thomas Jones Way, Exton, Pa. 19341; this material is stated by the manufacturer to be dipentaerythritol pentaacrylate.

Many polymers have a negative dispersion within the visible range; that is, their refractive index at 700 nm is smaller than their refractive index at 400 nm. Calculations show that such negative dispersion adversely affects the antireflection properties of the coating and hence it is desirable to reduce such negative dispersion as much as possible. The previously mentioned KYNAR polymer has a low refractive index and small negative dispersion, which renders it very suitable for use in the curable composition.

The desire to use a fluoroalkene polymer that provides low refractive index in the outer polymer layer and to use an acrylate or methacrylate cross-linker to provide hardness in the same layer might suggest that the outer polymer layer is made by compromising these two properties. It has been found that, if the formulation of the curable composition is carefully chosen, segregation of material occurs spontaneously during curing, resulting in a outer polymer layer having an outer portion enriched in the acrylate or methacrylate polymer (and thus enhanced hardness) and an inner portion enriched in the fluoroalkene polymer (and thus of reduced refractive index). An additional benefit of such segregation of acrylate of methacrylate polymer material during curing is that it enables the cross-linking to occur in an oxygen-containing atmosphere, such as air, thus avoiding the need for a nitrogen blanket as is customary during thin film ultra-violet curing, and thus reducing the cost of manufacture of the antireflection composite material. In contrast, the curable composition may be ultra-violet cured in an inert environment, such as under a nitrogen blanket.

The curable composition may be cured by any conventional method, but is desirably cured by a free radical curing, which may be initiated either thermally or by ultra-violet radiation, although the latter is generally preferred. Those skilled in polymer technology will be familiar with appropriate initiators, oxygen scavengers, and other components useful in such free radical curing. However, it should be noted that, because of the relative thinness of the outer polymer layer desired in the antireflection composite material, the type and proportion of initiator(s) required may differ from typical formulations intended for production of thicker polymer layers.

The antireflection composite material was formed by preparing the substrate: a 101 $\mu$m PET film was solvent coated on one surface with the previously mentioned TERRAPIN acrylic polymer coating, the solvent was allowed to evaporate and the film was placed under an ultra-violet lamp to cure the polymer coating.

The hard coated surface of the PET was then coated by direct sputtering (chemical vapor deposition may be used) with a 2.8 nm layer of Ni.

The outer polymer layer was prepared by preparing a liquid curable composition having the following composition (the proportions are by dry weight of the solution):

|  | % by weight ± tolerance |
|---|---|
| Poly(vinylidene fluoride) (KYNAR) | 46.8 ± 2.3 |
| Methyl methacrylate (ACRYLOID A21) | 6.9 ± 0.7 |
| Dipentaerythritol pentaacrylate (Sartomer SR 399) | 30.7 ± 1.5 |
| Multifunctional acrylate monomer (Sartomer CD9051) | 3.0 ± 0.3 |
| Coating additive (COATOSIL 3503[1]) | 4.0 ± 0.4 |
| Adhesion promoter (SILANE A1741[2]) | 0.5–3.0 ± 0.3 |
| Curing initiator (DARACURE 1173[3]) | 2.0 ± 0.2 |
| Curing initiator (QUANTACURE BMS[4]) | 4.0 ± 0.4 |
| Oxygen scavenger (DIDMA[5]) | 1.6 ± 0.2 |

[1]Available from OSi Specialties, 39 Old Ridgebury Road, Danbury, Connecticut 06810-5121.
[2]Available from OSi Specialties, 39 Old Ridgebury Road, Danbury, Connecticut 06810-5121.
[3]Available from Ciba-Geigy Corporation, 540 White Plains Road, P.O. Box 2005, Tarrytown, New York 10591-9005.
[4]Manufactured by Great Lakes Chemical Corporation, and available from Biddle Sawyer Corporation, 2 Penn Plaza, New York, New York 10121.
[5]Available from Aldrich Chemical Company, 1001 West St. Paul, Milwaukee, Wisconsin 53233.

The various components were prepared in stock solutions in methyl ethyl ketone (MEK), at 20 percent w/w, except that the ACRYLOID A21 and QUANTACURE BMS were prepared at 10 percent w/w, and the DARACURE and DIDMA were prepared at 5 percent w/w. The requisite quantities of the various stock solutions were then mixed, together with sufficient additional MEK to give 2000 g of a coating solution containing 2.75 percent solids w/w.

This coating solution was then coated using a slot coater onto the film bearing the inorganic layer of Ni, the solvent allowed to evaporate and the film placed under an ultra-violet lamp to produce an outer polymer coating approximately 110 nm thick.

Figure 2:
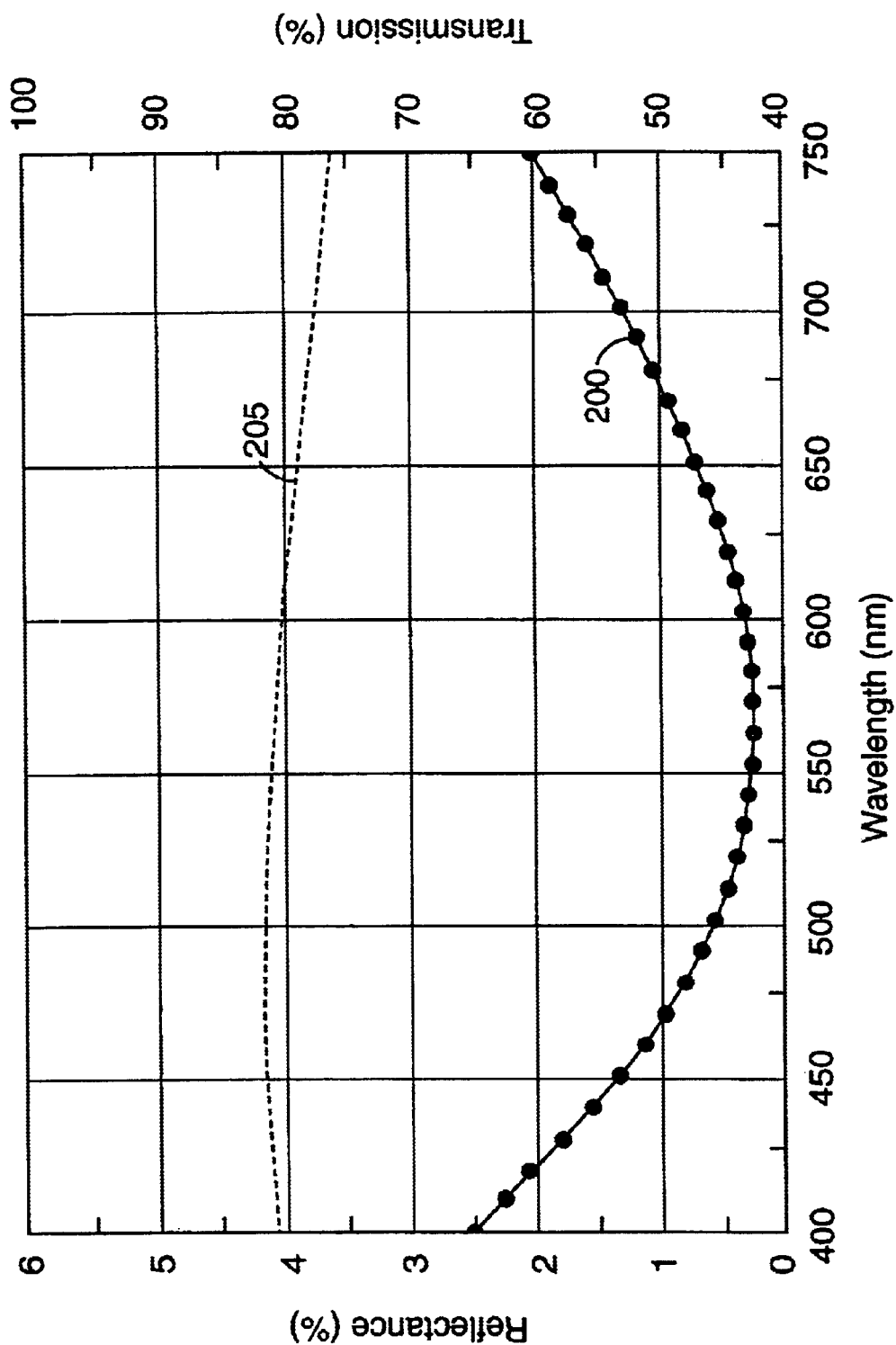
FIG. 2 shows reflectance and transmission curves for an antireflection composite material that includes on a substrate of hard coated PET an inorganic layer and an outer polymer layer.

Referring to FIG. 2, the resultant antireflection article (including the substrate and the antireflection composite material) had a low surface reflection as shown by curve 200 and about 80% transmission as shown by curve 205. As can be seen by FIG. 2, the antireflection article displays very good antireflection characteristics displaying a reflectance near about 0.4 percent over the range of about 450 nm to about 700 nm. The photopic reflectance value for curve 200 (measured according to CIE 1931, which specifies a weighted average of the reflectance over the spectral range of about 450 nm to about 650 nm centered at about 550 nm and weighted most highly at the center wavelength) was about 0.345 percent, which is comparable to the predicted value of 0.227 percent for curve 100 (Ni) in FIG. 1.

A number of implementations have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

What is claimed is:
1. An article including an antireflection composite material, the article comprising:
   a substrate;
   an inorganic metal or metal oxide layer deposited onto the substrate and having a thickness of from about 1 nm to about 10 nm; and a polymer layer in contact with the inorganic layer to form an outer surface of the antireflection composite material, the polymer layer having a thickness of from about 70 nm to about 120 nm.

2. The article of claim 1 in which the inorganic layer is a metal layer.

3. The article of claim 2 in which the metal comprises nickel.

4. The article of claim 3 in which the nickel has a thickness of from about 2 nm to about 3.5 nm.

5. The article of claim 2 in which the metal comprises chromium.

6. The article of claim 1 in which the polymer layer has a thickness of from about 100 nm to about 110 nm.

7. The article of claim 1 in which the polymer layer has a refractive index less than or equal to about 1.53 over the wavelength range of about 400 nm to about 700 nm.

8. The article of claim 1 further comprising a hard coat disposed between the substrate and the inorganic layer.

9. The article of claim 1 in which the inorganic layer absorbs a percentage of the incident light.

10. The article of claim 1 in which a total thickness of the antireflection composite material is about one-fourth of the wavelength of light that is the mean of the visible spectrum.

11. The article of claim 1 in which the article exhibits a photopic reflectance of less than about 0.5 percent over the wavelength range of about 400 nm to about 700 nm.

12. The article of claim 1 in which the polymer layer is formed by curing a curable composition in situ on the inorganic layer.

13. An article including an antireflection composite material, the article consisting essentially of:
   a substrate;
   an inorganic metal or metal oxide layer deposited onto the substrate and having a thickness of from about 1 nm to about 10 nm; and
   a polymer layer in contact with the inorganic layer to form an outer surface of the antireflection composite material, the polymer layer having a thickness of from about 70 nm to about 120 nm.

14. The article of claim 13 in which the polymer layer is formed by curing a curable composition in situ on the inorganic layer.

15. The article of claim 13 in which the inorganic layer is a metal layer.

16. The article of claim 15 which the metal comprises nickel.

17. The article of claim 16 in which the nickel has a thickness of from about 2 nm to about 3.5 nm.

18. The article of claim 15 in which the metal comprises chromium.

19. The article of claim 13 in which the polymer layer has a thickness of from about 100 nm to about 110 nm.

20. The article of claim 13 in which the polymer layer has a refractive index less than or equal to about 1.53 over the wavelength range of about 400 nm to about 700 nm.

21. The article of claim 13 in which the substrate is hard coated.

22. The article of claim 13 in which the inorganic layer absorbs a percentage of the incident light at a wavelength of about 550 nm.

23. The article of claim 13 in which the article exhibits a photopic reflectance of less than about 0.5 percent over the wavelength range of about 400 nm to about 700 nm.

24. A method for providing an antireflection composite material on a substrate, the method comprising:
   depositing an inorganic antireflection composite material on the substrate to create an inorganic metal or metal oxide layer having a thickness of from about 1 nm to about 10 nm;
   depositing a layer of curable composition on the inorganic layer; and
   effecting a curing of the deposited curable composition to form a polymer layer having a thickness of from about 70 nm to about 120 nm.

25. A method for providing an antireflection composite material on a substrate, the method consisting essentially of:
   depositing an inorganic antireflection composite material on the substrate to form an inorganic metal or metal oxide layer having a thickness of from about 1 nm to about 10 nm;
   depositing a layer of curable composition on the inorganic layer; and
   effecting a curing of the deposited curable composition to form a polymer layer having a thickness of from about 70 nm to about 120 nm.

26. The method of claim 25 which the inorganic layer is a metal layer.

27. The method of claim 26 in which the metal comprises nickel.

28. The method of claim 27 in which the nickel has a thickness from about 1 nm to about 10 nm.

29. The method of claim 27 in which the metal has a thickness from about 2 nm to 3.5 nm.

30. The method of claim 25 in which the polymer layer has a refractive index less than or equal to about 1.53 over the wavelength range of about 400 nm to about 700 nm.

31. The method of claim 25 in which the inorganic layer absorbs a percentage of the incident light at a wavelength of about 550 nm.

32. An antireflection composite material that may be deposited on a substrate, the antireflection composite material consisting essentially of:
   an inorganic metal or metal oxide layer having a thickness of from about 1 nm to about 10 nm; and
   a polymer layer formed by curing a curable composition in situ on the inorganic layer, the polymer layer having a thickness of from about 70 nm to about 120 nm.

* * * * *

UNITED STATES PATENT AND TRADEMARK OFFICE
CERTIFICATE OF CORRECTION

PATENT NO. : 6,632,513 B1
DATED : October 14, 2003
INVENTOR(S) : Choi, Hyung-Chul It is certified that error appears in the above-identified patent and that said Letters Patent is hereby corrected as shown below:

Title page,
Item [56], References Cited, U.S. PATENT DOCUMENTS, "5,234,748" reference, delete "Demirymont" and insert -- Demiryont --, in place thereof.
OTHER PUBLICATIONS, "Derwent Abstract of Japanese Application Publication" reference, delete "248807" and insert -- 248,807 --, in place thereof.

Column 7,
Line 47, after "claim 15" insert -- in --.

Column 8,
Line 33, after "claim 25" insert -- in --.
Line 40, insert -- about -- before "3.5 nm".

Signed and Sealed this

Fifth Day of July, 2005

JON W. DUDAS
*Director of the United States Patent and Trademark Office*